(12) United States Patent
Sega et al.

(10) Patent No.: US 7,535,672 B2
(45) Date of Patent: May 19, 2009

(54) MAGNETIC DISK DRIVE WITH ELASTIC SUPPORT MEMBER

(75) Inventors: Masahiko Sega, Kanagawa (JP); Shin Nagahiro, Kanagawa (JP); Jiro Kaneko, Kanagawa (JP); Gentarou Nakamura, Kanagawa (JP)

(73) Assignee: Hitachi Global Storage Technologies Netherlands B.V, Amsterdam (NL)

( * ) Notice: Subject to any disclaimer, the term of this patent is extended or adjusted under 35 U.S.C. 154(b) by 556 days.

(21) Appl. No.: 11/327,846

(22) Filed: Jan. 5, 2006

(65) Prior Publication Data

US 2006/0158775 A1 Jul. 20, 2006

(30) Foreign Application Priority Data

Jan. 5, 2005 (JP) ............................. 2005-000509

(51) Int. Cl.
*G11B 33/08* (2006.01)
(52) U.S. Cl. .................................. 360/97.02
(58) Field of Classification Search .............. 360/97.02, 360/97.01; 720/651, 648
See application file for complete search history.

(56) References Cited

U.S. PATENT DOCUMENTS

| | | | |
|---|---|---|---|
| 5,677,813 A | 10/1997 | Yoshida et al. | |
| 6,392,982 B1 * | 5/2002 | Kobayashi et al. | 720/692 |
| 6,831,830 B2 * | 12/2004 | Bruner et al. | 361/685 |
| 2005/0047077 A1 * | 3/2005 | Koh et al. | 361/685 |
| 2008/0151421 A1 * | 6/2008 | Asakura et al. | 360/97.02 |

FOREIGN PATENT DOCUMENTS

| | | |
|---|---|---|
| JP | 2000-163944 | 6/2000 |
| JP | 2001-291363 | 10/2001 |
| JP | 2003-45168 A * | 2/2003 |

* cited by examiner

*Primary Examiner*—Julie Anne Watko
(74) *Attorney, Agent, or Firm*—Townsend and Townsend and Crew LLP; John Henkhaus

(57) ABSTRACT

The positioning accuracy of a magnetic head decreases due to vibrations in the in-plane rotation mode of an HDD, which are caused by couple or disturbance occurring in seek operation, due to vibrations in the thrust mode, and the conical mode, of the spindle, which are caused by disturbance, and due to vibrations in the case thrust mode, the spindle fall mode, and the like. In one embodiment, an elastic support member includes a pillar-shaped part. The elastic support member is provided with a recess on a surface opposite to a corner of a base, and longitudinal fin projections on the upper and lower sides with respect to the recess. The base is provided at its corner with a horizontal fin that is parallel to a disk surface. The horizontal fin is inserted into the recess of the elastic support member. The longitudinal fin projections come into contact with the base, and control basic vibrational characteristics on both the upper and lower sides with respect to the horizontal fin. The pillar-shaped part is provided with a zig-zag-shaped part so that the pillar-shaped part may come into contact with a frame.

16 Claims, 16 Drawing Sheets

B-B cross section

A-A cross section

J-J cross section

I-I cross section

D-D cross section

C-C cross section

F-F cross section

E-E cross section

MAGNETIC DISK DRIVE WITH ELASTIC SUPPORT MEMBER

CROSS-REFERENCES TO RELATED APPLICATIONS

This application claims priority from Japanese Patent Application No. JP2005-000509, filed Jan. 5, 2005, the entire disclosure of which is incorporated herein by reference.

BACKGROUND OF THE INVENTION

The present invention relates to a magnetic disk drive, and more particularly to an improvement in positioning accuracy of a magnetic head with couple and disturbance occurring in seek operation of the magnetic disk drive.

In recent years, an improvement in recording density of a magnetic disk drive is required to increase the storage capacity thereof. For this purpose, it is important to increase the positioning accuracy of the magnetic head. However, there are various factors that obstruct the improvement in positioning accuracy. The obstruction factors include: a positioning error caused by the force of air during the rotation of a disk; a positioning error caused by vibrations of a mechanical system as a result of positioning operation of an actuator; and a positioning error occurring when vibrations are applied from the outside of the magnetic disk drive. In order to reduce these positioning errors, it is necessary to widen a control band of positioning control, or to reduce vibrations of the mechanical system itself.

Among them, problematic vibrations are the vibrations that are applied from the outside of the magnetic disk drive, and the vibration caused by "couple" occurring in the base as a result of the positioning operation of the actuator. For example, under the condition that a plurality of magnetic disk drives are placed in a case of a server, operation of other disk drives causes such disturbance. Although the access time is improved, in other words, although vibrations occurring at the time of seek operation increase in surrounding magnetic disk drives in a case, high-density devices produced in recent years have large problems including: requirements of improved positioning accuracy; the decreased stiffness of a case for storing magnetic disks as a result of cost reduction; and a low control band. Moreover, what becomes a problem in like manner is an in-plane rotation mode in which by the couple including reaction force occurring in a VCM at the time of the positioning operation of the actuator and thrust transferred from a coil to a pivot, the base vibrates as a rigid body at natural frequency with the stiffness of the case being used as a spring constant.

In the in-plane rotation mode of the whole magnetic disk drive as a rigid body, a position of a target track on a disk deviates in response to the rotation of the device as a whole. On the other hand, an actuator stays at the same position without rotating by the inertia. As a result, a positioning error occurs. As a method for solving this problem, patent document 1 (Japanese Patent Laid-open No. 2001-291363) provides a mechanism as follows: by use of a support member having a cylindrical or curved shape, flexibly supporting a head disk assembly (HDA) on the frame at an in-plane rotation frequency of about 20 Hz; and thereby separating the natural frequency from the frequency in the in-plane rotation mode in which the whole magnetic disk drive is used as the moment of inertia, and in which the stiffness of the case is used as a spring; isolating disturbance of the case from vibrations; and making it hard to excite residual vibrations caused by couple so that servo compression can be expected.

BRIEF SUMMARY OF THE INVENTION

There are several vibration modes of a magnetic disk drive, which occur when vibrations are applied from the outside. The vibration modes mainly include: first of all, an in-plane rotation mode of the whole magnetic disk drive as a rigid body, excited by the moment of inertia of the whole magnetic disk drive, around an axis perpendicular to a disk surface, and rotation disturbance in a disk surface caused by seek operation of surrounding magnetic disk drives with respect to a vibration system comprising a spring of a storing case; a thrust mode of a spindle, which is excited by translational disturbance coming in the out-of-plane direction of a disk, with the spindle acting as mass and with bearing stiffness in a thrust direction of the spindle and the out-of-plane stiffness of a base acting as a spring; and a conical mode as a spindle fall mode, which is excited by the moment of inertia of a spindle around the diameter of a disk, and rotation disturbance in the out-of-plane direction of the base caused by the bearing stiffness in a radial direction of the spindle, and the out-of-plane stiffness of a base being acting as a spring. The above-mentioned in-plane rotation mode is also a vibration mode caused by couple occurring in the base as a result of positioning operation of a carriage.

Moreover, although the above-mentioned thrust and conical modes are found in an independent magnetic disk drive, these thrust and conical modes may sometimes produce a new coupled mode that is associated with a storing case on the basis of the stiffness of the case. From the viewpoint of the magnetic disk drive, this coupled mode can also be said to be forced vibrations from the case, by which thrust deformation of the spindle causes a fall. Hereinafter, this coupled mode is called "case thrust coupled mode", or "case spindle fall coupled mode." Because the case thrust coupled mode or the case spindle fall coupled mode is a coupled mode with a case, damping of which is small, vibrations are large as compared with those in the thrust mode and the conical mode. Accordingly, a larger influence is exerted upon the positioning accuracy.

Patent document 1 recites two main types of materials for the supporting member: a thin-plate metal spring and rubber/gel. For the in-plane rotation mode, if a design is made at 20 Hz, no large difference in property is found for any material. However, although it is not described in patent document 1, a significant difference in property is found for the thrust mode and conical mode of the spindle, and for the case thrust coupled mode and case spindle fall coupled mode. In the case of the rubber/gel, an effect of isolating vibrations is produced also in the thrust mode and conical mode of the spindle, and in the case thrust coupled mode and case spindle fall coupled mode. However, in the case of the thin-plate metal spring, no effect is produced. It is because the stiffness in the out-of-plane direction is very large due to shear deformation of a metal plate spring.

In addition, in the case of the rubber/gel, because of a cylindrical shape or a curved shape, shear deformation of the rubber/gel occurs in the out-of-plane direction of the HDA, and accordingly deformation by the tare weight of the HDA occurs to a large extent. Therefore, with the object of protecting a form factor, it is necessary to allow a considerably large clearance between the HDA and a frame or a PCB. Because of it, the mounting space in the out-of-plane direction of the HDA is limited. To be more specific, possible limitations include the number of disks and the access capability because a force constant is insufficient as a VCM cannot be thickened. Further, when a shock is given or strong vibrations are applied, buckling easily occurs because of the cylindrical shape, or the curvature shape, of the rubber/gel. Accordingly, there is also a high possibility that a support member will be damaged.

In the meantime, the deformation by the tare weight of the HDA becomes larger in the in-plane direction of the HDA because of the bending deformation of the rubber/gel. Because it is necessary to allow a larger clearance between the base or a cover and the frame, there are limitations in which the mounting space becomes narrower, for example.

Needless to say, limitations placed on the out-of-plane direction of the HDA are severer than those placed on the in-plane direction. It is because serious problems are produced by the limitations of the number of disks (the capacity), and the limitations of the access capability caused by an insufficient force constant. The insufficient force constant occurs because a VCM cannot be thickened.

A feature of the present invention is to provide a magnetic disk drive that improves positioning accuracy, which otherwise deteriorates due to the in-plane rotation mode of the whole magnetic disk drive as a rigid body, which is caused by disturbance or couple; the thrust mode and conical mode of the spindle, which is caused by disturbance; the case thrust coupled mode; and the case spindle fall coupled mode.

According to one aspect of the present invention, there is provided a magnetic disk drive comprising: a spindle mounting a magnetic disk thereon; a spindle motor for providing the spindle with a driving force to rotate the spindle; a base for supporting the spindle through bearings so that the spindle can rotate; an actuator for supporting a magnetic head that writes/reads information to/from the magnetic disk, the actuator being mounted to the base; a frame for surrounding the base; and a pillar-shaped elastic support member provided with a recess into which a horizontal fin protruding from the base is inserted, the elastic support member being placed between the frame and the base.

In some embodiments, the elastic support member is placed in at least two of four corners of the base. The horizontal fin may also be metal fittings for mounting the elastic support member to the base. The elastic support member has a zigzag-shaped part that comes into contact with the frame. The pillar-shaped elastic support member is provided with respective projections on the upper and lower sides thereof with respect to the recess, the projections coming into contact with the base.

It is desirable that the elastic support member include a horizontal plate inside the elastic support member. The elastic support member may also comprise an oil damper that includes oil and an enclosure for enclosing the oil, the enclosure being made of an elastic material. The oil damper comprises a partition wall for partitioning the enclosure, and the partition wall may also be provided with an orifice. It is desirable that the frame be in conformity to the form factor standards.

According to another aspect of the present invention, there is provided a magnetic disk drive comprising: a spindle mounting a magnetic disk thereon; a spindle motor for providing the spindle with a driving force to rotate the spindle; a base for supporting the spindle through bearings so that the spindle can rotate; an actuator for supporting a magnetic head that writes/reads information to/from the magnetic disk, the actuator being mounted to the base; a frame for surrounding the base; a pillar-shaped elastic support member provided with a recess into which a horizontal fin protruding from the base is inserted, the elastic support member being placed between the frame and the base; a circuit board on which electronic parts are mounted, the circuit board being mounted to the base; and a FPC for connecting parts on the base to electronic parts on the circuit board, the FPC being formed in a U-shape so that clearances are provided outside two straight-line parts of the U-shape.

According to the present invention, it is possible to prevent the positioning accuracy from decreasing in the in-plane rotation mode of the whole magnetic disk drive as a rigid body, which is caused by disturbance or couple, in the thrust mode, and the conical mode, of the spindle, which is caused by disturbance, and in the case thrust coupled mode, the case spindle fall coupled mode, and the like.

DETAILED DESCRIPTION OF THE INVENTION

According to the present invention, for the out-of-plane direction, an HDA (Head Disk Assembly) is carried on a frame by means of compressive deformation of an elastic support member surrounded by a base and a frame of the HDA. On the other hand, for the in-plane direction, the HDA is carried on the frame by means of shear deformation. A horizontal fin-shaped member, therefore, supports the elastic support member from the base. Further, a PCB (Printed Circuit Board) is also mounted to the frame; and an electrical connection is made between the HDA and the PCB with cables, the stiffness of which is small. With this structure, the elastic support member is subjected to compressive deformation with respect to the out-of-plane direction, whereas it is subjected to shear deformation with respect to the in-plane direction. Because the stiffness of deformation is high in the order of compression, shear, and bending, a clearance between the base or the cover and the frame can be reduced.

Instead of this, in order to achieve an in-plane rotation frequency of about 20 Hz, it is necessary to reduce, or more specifically, elongate a cross-sectional area at right angles to the out-of-plane direction of the elastic support member. Because of the elongated cross-sectional area and the small stiffness, it becomes difficult to design the clearance so that the HDA does not collide with the frame. As for the out-of-plane direction, if the buckling occurring when a shock is given or strong vibrations act causes damage to the elastic support member, or when the tare weight of the HDA is supported by shear deformation in the in-plane direction, clearance management goes out of order by creep. When the HDA comes in contact with the frame or the stopper, the stiffness becomes larger, and consequently expected vibrational characteristics cannot be achieved. With the object of avoiding this, the elastic support member is surrounded by the base and the frame in a direction of shear deformation. However, the natural frequency in the in-plane rotation mode cannot be sometimes reduced only by surrounding the elastic support member. Therefore, part of the elastic support member is provided with an area, the stiffness of which is small, such as a bending part, a projection, and a concave, to adopt a structure in which the elastic member touches the base or the frame. This facilitates the clearance design, and provides the expected vibrational characteristics.

Figure 3A:
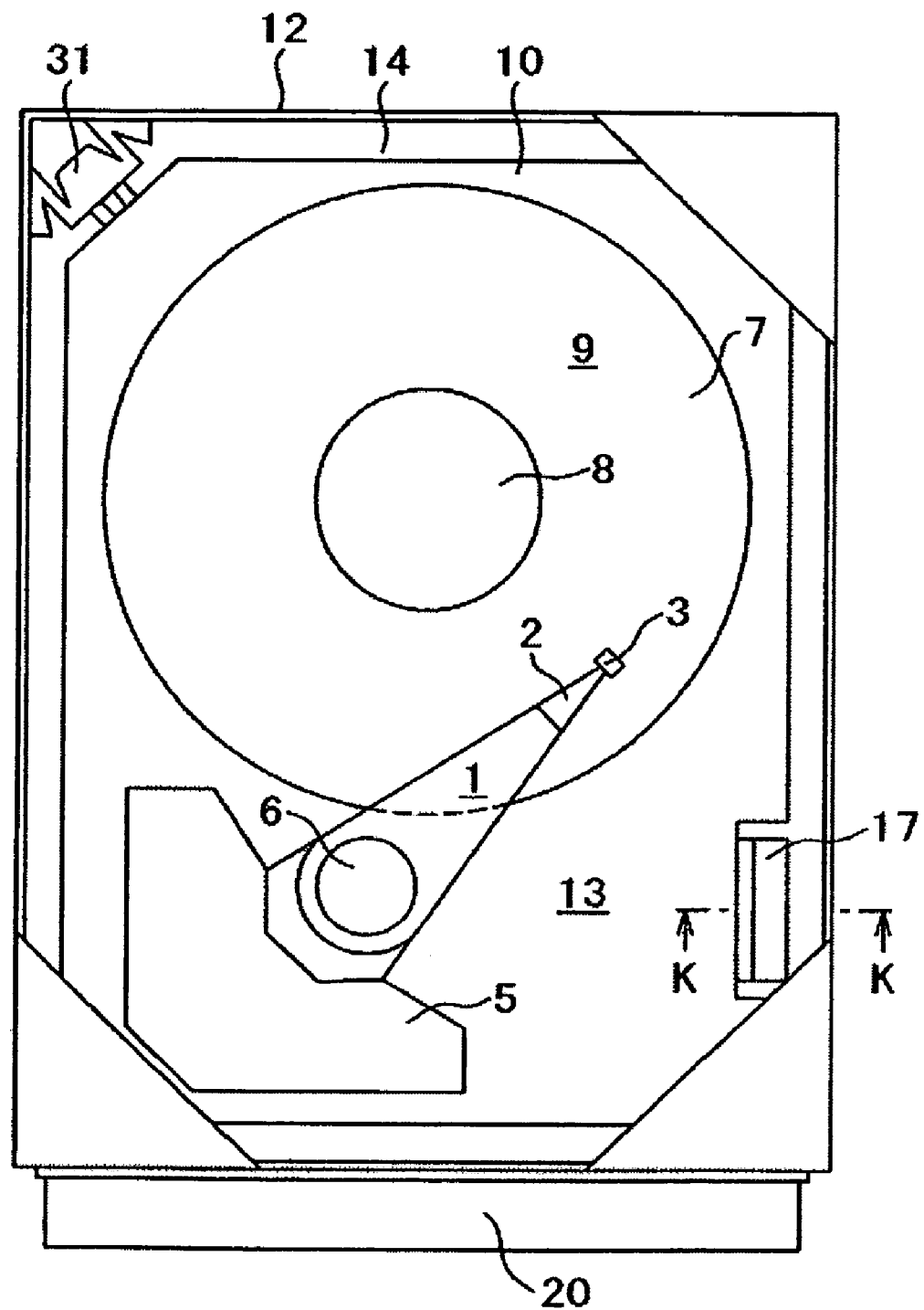
FIG. 3A is a plan view of a magnetic disk drive in which the support structure of the HDA according to the first embodiment of the present invention is adopted.
Figure 3B:
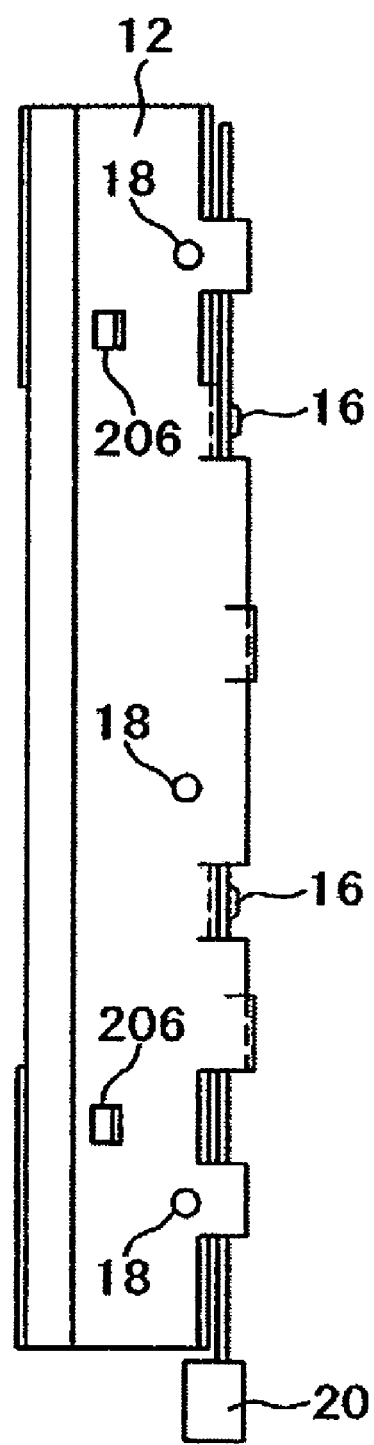
FIG. 3B is a side view of the magnetic disk drive shown in FIG. 3A.
Figure 3C:
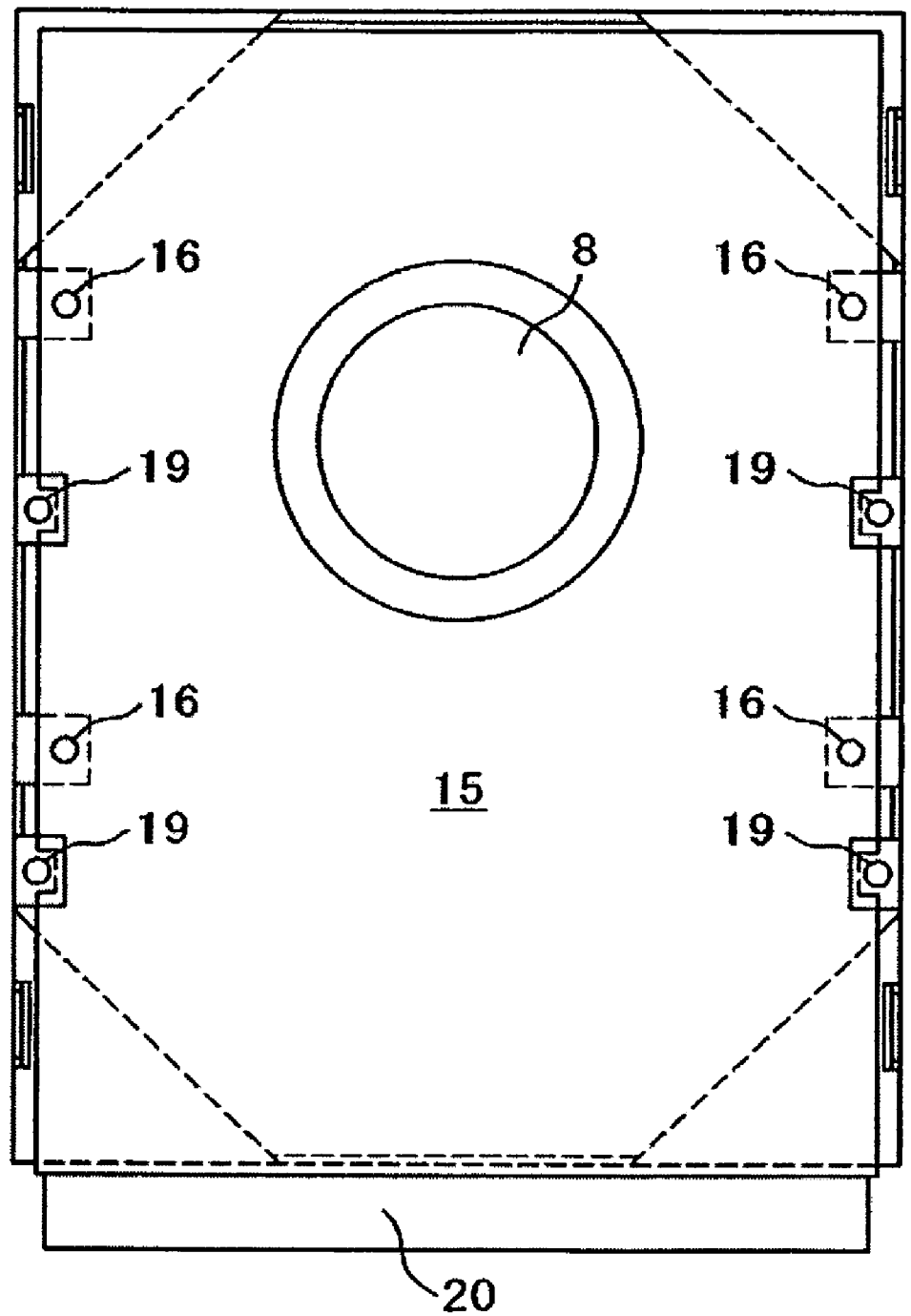
FIG. 3C is a bottom plan view of the magnetic disk drive shown in FIG. 3A.

Embodiments of the present invention will be described in detail with reference to drawings below. FIGS. 3A, 3B, and 3C are diagrams each illustrating a configuration of a magnetic disk drive (HDD: Hard Disk Drive) according to a first embodiment of the present invention. FIG. 3A is a plan view; FIG. 3B is a side view; and FIG. 3C is a bottom plan view. A slider 3 equipped with a magnetic head (not illustrated) is attached to the tip of an actuator 1 through a suspension 2. By feeding an electric current to the coil of a voice coil motor (VCM) 5 (this coil cannot be seen because it is placed inside the VCM 5), the force is generated between the VCM 5 and the coil, which causes the actuator 1 to pivotally move about a bearing unit 6. Thus, it is possible to position the slider 3 to an arbitrary radius position on a magnetic disk 7 attached to a spindle motor 8.

What are placed on a base 10 include the actuator 1, the VCM 5, and a spindle 9 comprising a spindle motor 8 to which the magnetic disk 7 is attached. The base 10 is carried on a frame 12 through elastic support members 31, which support the base 10 at four corners. A cover is paired with the base 10 to seal mechanical parts (HDA: Head Disk Assembly) 13 of the magnetic disk drive therebetween. This cover is not included in order to show how the mechanical parts are placed inside. In addition, in order to show an elastic support member 31 at the upper left corner, a triangular reinforcement, which is part of the frame 12, is also omitted. FIG. 3A also shows a clearance 14 adapted to isolate the HDA 13 from vibrations. As shown in FIG. 3C, a circuit board (PCB: Printed Circuit Board) 15 is secured to the frame 12 with screws 16. The PCB 15 is provided with a hole to allow the spindle motor 8 to be inserted in such a manner that clearance is allowed between the PCB 15 and the spindle motor 8. An FPC (Flexible Printed Circuit) 17 electrically connects the PCB 15 to the HDA 13. As shown in FIGS. 3B and 3C, the frame 12 is provided with six screw holes 18 on side surfaces and four screw holes 19 on the bottom surface. These screw holes are used to mount the frame to a case of a customer.

Here, vibration calculation will be outlined so that the approximate size of the elastic support member can be determined. A 3.5-inch HDD is adopted in terms of an HDA. By use of eight cylindrical elastic support members each having a diameter of 5 mm and a height of 8 mm, cylindrical axes are mounted to the top and bottom of a horizontal fin from the base at four corners in the out-of-plane direction of a disk. It is assumed that the stiffness Hs is 50 in the case of rubber.

According to "Vibration-proof Rubber" issued by Japan Association of Rolling Stock Industries, modulus of transverse elasticity G is expressed by the following equation:

$$G=(53+7.77 \times Hs)/(100-Hs) \text{ kgf/cm}^2$$

Accordingly, in the case of Hs=50, the calculation is made as follows:

$$G=(53+7.77 \times 50)/(100-50)=8.83 \text{ kgf/cm}^2$$

If the number of cylinders is one, stiffness Kc in a direction in which a cylinder is compressedly deformed is calculated as follows:

$$Kc=(AL \times I/h) \times G \text{ kgf/cm}$$

where:

AL: circular cross sectional area of the cylinder
h: axial height of the cylinder
I: shape factor ($I=3+4.935 \times S^2$)
S: $S=d/(4 \times h)$
d: diameter of the cylinder.

Accordingly, the following values are obtained:

$$AL=0.25^2 \times \Pi=0.1963$$

$$S=0.5/(4 \times 0.8)=0.1563$$

$$I=3+4.935 \times 0.1563^2=3.12$$

$$Kc=(0.1963 \times 3.12/0.8) \times 8.83=6.76 \text{ kgf/cm}=0.676 \text{ kgf/mm}.$$

In addition, if the number of cylinders is one, stiffness Ks in the shearing direction of the cylinder is calculated as follows:

$$Ks=(AL \times J/h) \times G \text{ kgf/cm}$$

where:

J: shape factor ($J=1/(1+0.444 \times (h/d)^2)$).

Accordingly, the following values are obtained:

$J=1/(1+0.444\times(0.8/0.5)^2)=0.468$ $Ks=(0.1963\times0.468/0.8)\times8.83=1.014$ kgf/cm=0.1014 kgf/mm.

For example, in the case of a 3.5-inch HDD having a thickness of about 25.4 mm, the weight of the HDD is about 750 g; rotational inertia in the in-plane direction is about 1380 kg·mm²; and rotational inertia about an axis in the out-of-plane direction perpendicular to a cross section having an area of about 25.4×101.6 mm is about 960 kg·mm².

Accordingly, a rotational spring constant in an in-plane rotation mode is calculated as follows:

$K\theta i=0.1014\times75\times8=4560$ kg·mm²

Here, 75 mm is a span from the center of in-plane rotation to the elastic support member of the HDD.

On the basis of the above, the natural frequency in the in-plane rotation mode is calculated as follows:

$f\theta in=1/(2\times\Pi)\times\sqrt{(4560/(1380/9800))}\approx29$ Hz

Further, a rotational spring constant about an axis in the out-of-plane direction perpendicular to a cross section having an area of about 25.4×101.6 mm is calculated as follows:

$K\theta out=0.676\times45\times8=10950$ kgf·mm

Here, 50 mm is a span from the center of rotation about the axis in the out-of-plane direction of the HDA to the elastic support member.

On the basis of the above, the natural frequency in the out-of-plane rotation mode is calculated as follows:

$f\theta out=1/(2\times\Pi)\times\sqrt{(10950/(480/9800))}\approx75$ Hz

In addition, the natural frequency in a thrust direction of the HDA is:

$fout=1/(2\times\Pi)\times\sqrt{(0.676\times8/(0.75/9800))}\approx42$ Hz

In the meantime, as the flexure by the tare weight of the HDA, the flexure in the in-plane direction σin and the flexure in the out-of-plane direction σout are calculated respectively as follows:

$\sigma in=0.75/(0.1014\times8)\approx0.92$ mm $\sigma out=0.75/(0.676\times8)\approx0.13$ mm These values are calculated on the assumption that the stiffness Hs is 50. Hs=50 is rather low from the viewpoint of hardness of rubber. Judging from the aspect of the size (Φ5×8 mm), although the natural frequency in the in-plane rotation mode does not reach about 20 Hz, the size has already become unstable.

For Hs=30, which is too low, rubber with this value is not often used as vibration-proof rubber. However, in the case of Hs=30, the following values are obtained by the above-mentioned equations:

$f\theta in\approx20$ Hz $f\theta out\approx51$ Hz $fout\approx29$ Hz $\sigma in\approx2.0$ mm $\sigma out\approx0.3$ mm As a result, the natural frequency in the in-plane rotation mode becomes about 20 Hz.

Here, attention is paid to a ratio of the natural frequency of each support mode to the vibration frequency of a problem mode in the case of the stiffness ranging from Hs=30 to Hs=50, which is shown in Table 1. Even in the case of an excitation component of 140 Hz at the time of full span seek at the lowest frequency, a ratio of 370 Hz of the next conical to the frequency of a support system is 5 through 7 times. Accordingly, it is understood that a similar ratio is ensured. Properly speaking, the amount of exciting force should also be taken into consideration. However, even such comparison of properties enables us to understand that the in-plane rotation mode of the HDA should be used at low frequency.

TABLE 1

| Problem mode | Natural frequency in problem mode | Frequency of corresponding support system | Ratio |
| --- | --- | --- | --- |
| Spindle conical | 370 Hz | $f\theta_{out}=51$ through 75 Hz | 7.3 through 4.9 times |
| Spindle thrust | 500 Hz | $f_{out}=29$ | 17 through 12 times |
| HAD case in-plane rotation | 500 Hz (the case is a spring) | $f\theta_{in}=20$ through 29 Hz | 25 through 12 times |
| HAD self-seek in-plane rotation | 140 Hz (exciting force at the time of full span seek) | $f\theta_{in}=20$ through 29 Hz | 7.0 through 4.8 times |

Thus, if the frequency in the in-plane rotation mode is about 30 Hz when rubber is used, a possible low frequency can be found. If the frequency is about 20 Hz when a material like gel is used, which is softer than rubber, a possible low frequency can be found. However, the structure having a cylindrical shape, which is usually found in general vibration-proof rubber, is elongated and accordingly is unstable. Therefore, improvement in the structure is needed to solve problems such as buckling and creep.

Figure 1A:
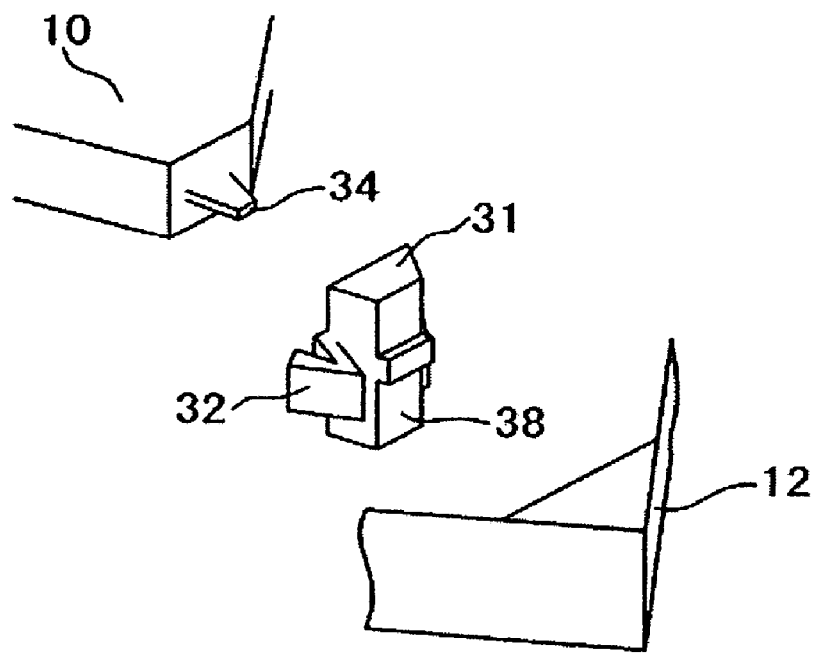
FIG. 1A is a diagram illustrating a support structure of an HDA according to a first embodiment of the present invention.
Figure 1B:
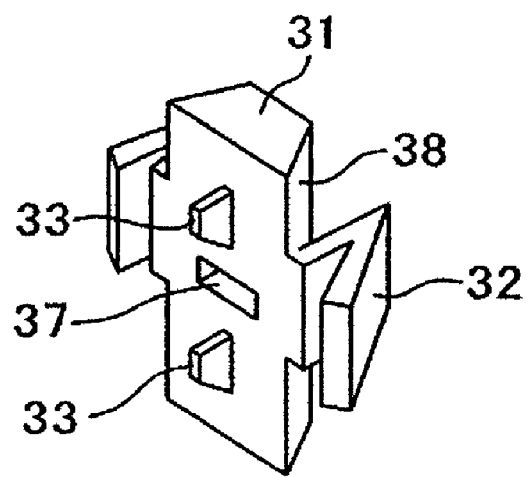
FIG. 1B is a perspective view of an elastic support member in FIG. 1A, which is viewed from the opposite side thereof.
Figure 4A:
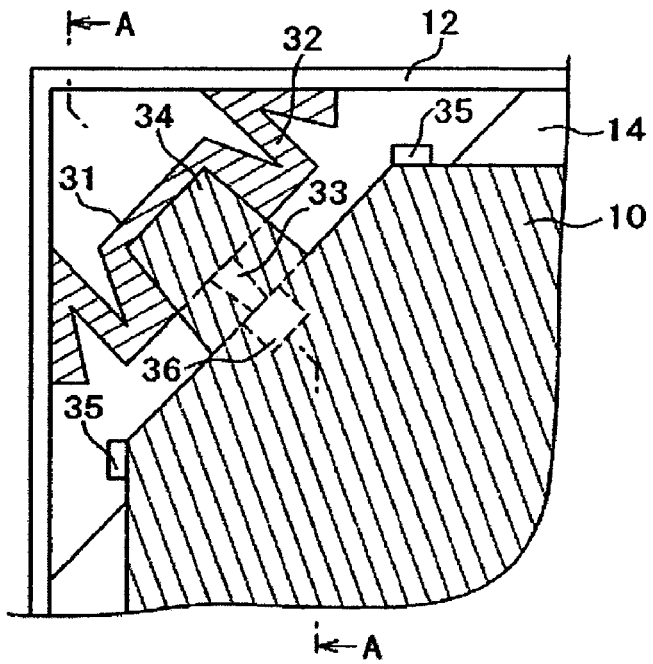
FIG. 4A illustrates a corner of the magnetic disk drive in FIG. 3A, and is a cross-sectional view taken along line B-B of FIG. 4B.
Figure 4B:
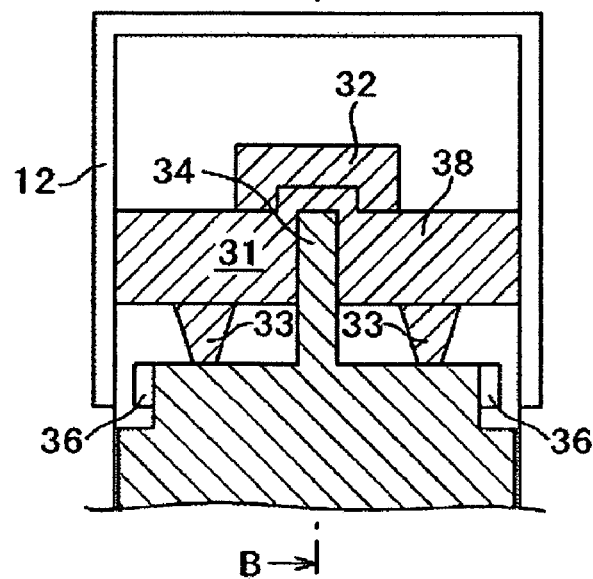
FIG. 4B is a cross-sectional view taken along line A-A of FIG. 4A.

Next, the structure of the elastic support member 31 will be described in detail with reference to FIGS. 1A, 1B, 4A, and 4B. FIG. 1A is a diagram illustrating the relationship between a corner of the base 10, the elastic support member 31, and a corner of the frame 12. FIG. 1B is a diagram illustrating the elastic support member 31 as viewed from the base 10. FIG. 4A is a top view illustrating the base 10 and the corner of the frame 12, and is a cross-sectional view taken along line B-B of FIG. 4B. FIG. 4B is a cross-sectional view taken along line A-A of FIG. 4A. The elastic support member 31 comprises a pillar-shaped part 38, a cross section of which has a trapezoidal shape. The pillar-shaped part 38 controls basic vibrational characteristics. The elastic support member 31 is provided with the pillar-shaped part 38 on both the upper and lower sides with respect to a recess 37 into which a horizontal fin 34 is inserted. The base 10 is provided at its corner with the horizontal fin 34 that is parallel to a disk surface. Accordingly, shear stiffness of the pillar-shaped part 38 of the elastic support member 31 is involved in the in-plane rotation mode of the HDD as a rigid body. In addition, compression stiffness of the pillar-shaped part 38 of the elastic support member 31 is involved in the out-of-plane and out-of-plane rotation mode of the HDD, relating to the thrust and conical modes of a spindle, the case thrust coupled mode, and the case spindle fall coupled mode.

Basic dimensions of the pillar-shaped part 38 of the elastic support member 31 on both the upper and lower sides with respect to the horizontal fin 34 are similar to those described above taking the numerical values as examples. However, because the shape thereof is elongated as a matter of course, it is necessary to solve the problem of instability. In addition, because the flexure in the in-plane direction δin becomes 1 through 2 mm, it is required to prevent creep from causing the base 10 of the HDD and the frame 12, which are members with high stiffness, to collide with each other. To meet the requirement, a zigzag-shaped part denoted by reference numeral 32 and projections each having a longitudinal-fin shape denoted by reference numeral 33 are provided to be in contact with the frame 12 and the base 10, respectively. As far as the out-of-plane direction is concerned, the zigzag-shaped part 32 and the longitudinal-fin projections 33 are partially formed in the thickness direction of the HDA, and shear deformation is smaller in stiffness than compressive deformation. Accordingly, the zigzag-shaped part 32 and the longitudinal-fin projections 33 do not exert a large influence upon the vibration frequencies in the out-of-plane and the out-of-plane rotation mode of the HDD from the viewpoint of stiffness. Moreover, also as for the in-plane rotation mode, the frequency of which should be lower, the stiffness of bending deformation of the zigzag-shaped part 32 is smaller, and the stiffness of bending deformation of the longitudinal-fin projections 33 is also smaller in the in-plane rotation direction. The zigzag-shaped part 32 and the longitudinal-fin projections 33, therefore, do not exert a large influence upon the vibration frequency in the in-plane rotation mode. As a result, expected vibrational characteristics are ensured. However, spring characteristics of the zigzag-shaped part 32 become nonlinear, that is, contact is increased as the zigzag-shaped part 32 is more bent. Accordingly, it is necessary to design the zigzag-shaped part 32 so that a spring constant does not increase rapidly even when the flexure in the in-plane direction δin becomes 1 through 2 mm as a result of sufficiently supporting the tare weight of the HDA.

Figure 2A:
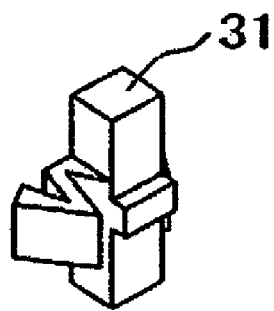
FIG. 2A is a diagram illustrating an elastic support member as a modified example.
Figure 2B:
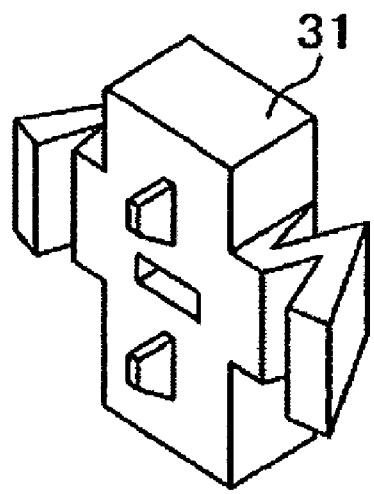
FIG. 2B is a perspective view of an elastic support member in FIG. 2A, which is viewed from the opposite side thereof.

As understood from the above description, in order to ensure the flexure δin particularly in the in-plane direction, it is possible to mount a disk having a diameter of 95 mm to an HDD with, for example, a 35-inch type form factor. However, it is difficult to adopt such a mechanism if the disk having a diameter of 95 mm is used. Therefore, as the disk size that is commonly used, it is necessary to adopt the small disk size, for example, 84 mm. If the disk having a diameter of 84 mm is used, the diameter is shortened by 11 mm (=95−84 mm). Accordingly, it is possible to allow a clearance of 5.5 mm on one side, which makes it possible to accommodate the flexure in the in-plane direction δin even when the flexure becomes 1 through 2 mm. Incidentally, the HDA is formed with dead stoppers 35, 36 on the side and on the upper and lower sides. The dead stoppers 35, 36 are used as dead stops for preventing the HDA 13 and the frame 12, which are members with high stiffness, from colliding with each other when a shock, a value of which is higher than the G value, is given, or strong vibrations act occurs, to such an extent that the zigzag-shaped part 32 cannot stand them. Incidentally, in the embodiment described above, the cross section of the elastic support member has the trapezoidal shape. However, the shape is not limited to the trapezoidal shape. A quadrangular shape may also be adopted as shown in FIGS. 2A and 2B.

Figure 5A:
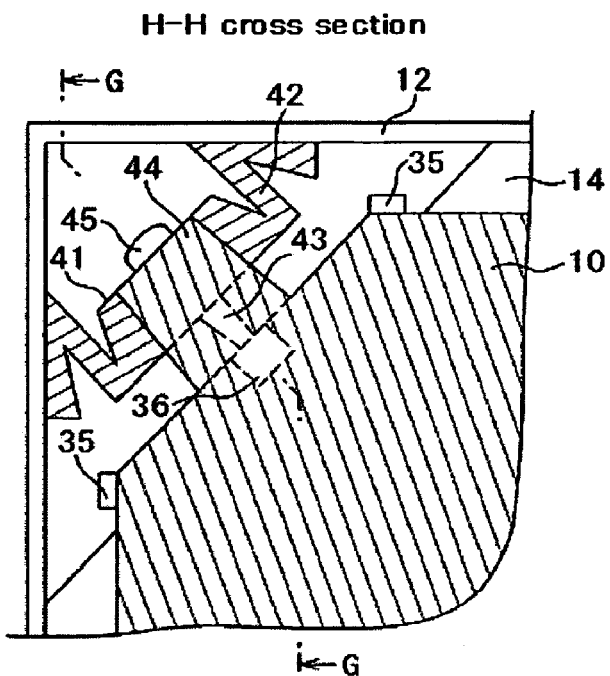
FIG. 5A illustrates a support structure of an HDA according to a second embodiment, and is a cross-sectional view taken along line G-G of FIG. 5B.
Figure 5B:
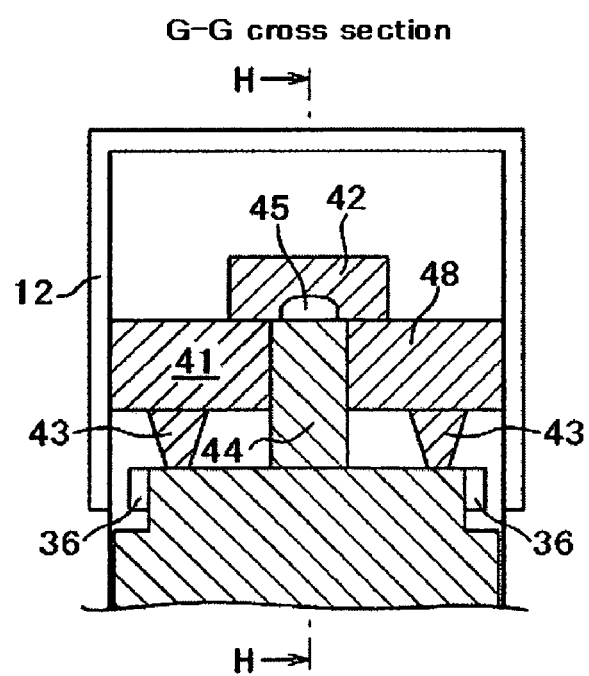
FIG. 5B is a cross-sectional view taken along line H-H of FIG. 5A.

Next, a second modified example will be described with reference to FIGS. 5A and 5B. FIG. 5A is a cross-sectional view taken along line H-H of FIG. 5B; and FIG. 5B is a cross-sectional view taken along line G-G of FIG. 5A. An elastic support member 41 is mounted to a mounting bracket 44 that is parallel to a disk surface. The mounting bracket 44 is secured to a corner of a base 10 by use of a screw 45. A pillar-shaped part 48 of the elastic support member 41, which controls basic vibrational characteristics, is mounted on both the upper and lower sides with respect to the mounting bracket 44. Accordingly, shear stiffness of the pillar-shaped part 48 of the elastic support member 41 is involved in the in-plane rotation mode of the HDD as a rigid body. In addition, compression stiffness of the pillar-shaped part 48 of the elastic support member 41 is involved in the out-of-plane and the out-of-plane rotation mode of the HDD, relating to the thrust and conical modes of the spindle, the case thrust coupled mode, and the case spindle fall coupled mode.

Basic dimensions of the pillar-shaped part 48 of the elastic support member 41 on both the upper and lower sides with respect to the mounting bracket 44 are similar to those described in the first embodiment. However, because the shape thereof is elongated as a matter of course, it is necessary to solve the problem of instability. In addition, because the flexure in the in-plane direction δin becomes 1 through 2 mm, it is necessary to prevent creep from causing the base 10 with high stiffness and the frame 12 with high stiffness to collide with each other in the HDD. Accordingly, a zigzag-shaped part denoted by reference numeral 42 and projections having a longitudinal-fin shape denoted by reference numeral 43 are formed so as to be in contact with the frame 12 and the base 10, respectively. As far as the out-of-plane direction is concerned, the zigzag-shaped part 42 and the longitudinal-fin projections 43 are partially formed in the thickness direction of the HDA, and they are subjected to shear deformation. Therefore, the zigzag-shaped part 42 and the longitudinal-fin projections 43 do not exert a large influence upon the vibration frequencies in the out-of-plane and the out-of-plane rotation mode of the HDD from the viewpoint of stiffness. Moreover, also as for the in-plane rotation mode, the frequency of which should be lower, the stiffness of bending deformation of the zigzag-shaped part 42 is smaller, and the stiffness of bending deformation of the longitudinal-fin projections 43 is also smaller in the in-plane rotation direction. The zigzag-shaped part 42 and the longitudinal-fin projections 43, therefore, do not exert a large influence upon the vibration frequency in the in-plane rotation mode. As a result, expected vibrational characteristics are ensured. However, spring characteristics of the zigzag-shaped part 42 become nonlinear. Accordingly, it is necessary to design the zigzag-shaped part 42 so that a spring constant does not increase rapidly even when the flexure in the in-plane direction δout becomes 1 through 2 mm as a result of sufficiently supporting the tare weight of the HDA.

Figure 6A:
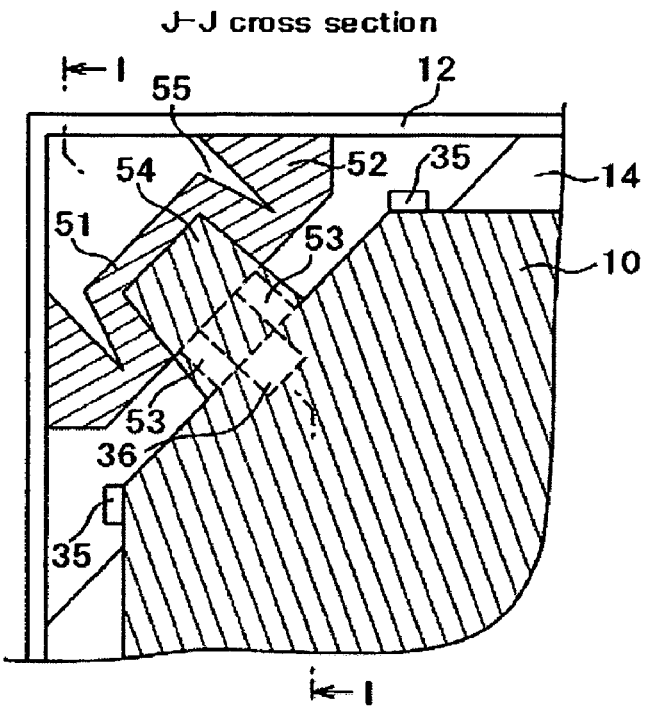
FIG. 6A illustrates a support structure of an HDA according to a third embodiment, and is a cross-sectional view taken along line I-I of FIG. 6B.
Figure 6B:
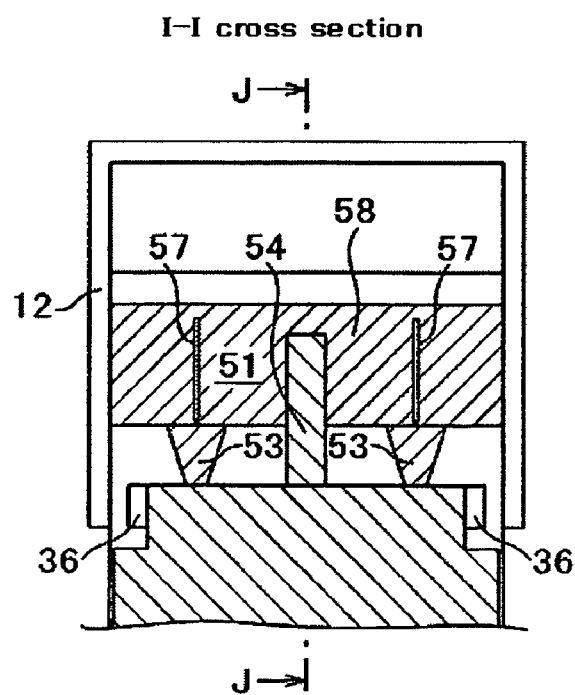
FIG. 6B is a cross-sectional view taken along line J-J of FIG. 6A.

A third embodiment will be described with reference to FIGS. 6A and 6B. FIG. 6A is a cross-sectional view taken along line J-J of FIG. 6B; and FIG. 6B is a cross-sectional view taken along line I-I of FIG. 6A. Paying attention to the elastic support member 51, the base 10 is provided at its corner with a horizontal fin 54 that is parallel to a disk surface. The pillar-shaped part 58 of the elastic support member 51, which controls basic vibrational characteristics, is formed on both the upper and lower sides with respect to the horizontal fin 54. Up to this point, the configuration is the same as the first embodiment. However, the stiffness of a material used as the elastic support member 51 is smaller than that of the material used in the first embodiment. This means that the frequency in the in-plane rotation mode can be decreased. However, this also means that the flexure in the out-of-plane direction caused by the tare weight of the HDA also increases at the same time. First of all, in this embodiment, in order to reduce the flexure in the out-of-plane direction without increasing so much the frequency in the in-plane rotation mode, which has been decreased with much effort, horizontal plates 57 are mounted in the middle of the pillar-shaped part 58. The elongate pillar-shaped part 58 of the elastic support member 51, the stiffness of which is small, swells in the center of the pillar-shaped part 58 when supporting the tare weight of the HDA in the out-of-plane direction. This causes the flexure in the out-of-plane direction to increase. Mounting the horizontal plates 57 improves the degree of elongation. As a result, the pillar-shaped part 58 becomes hard to swell in the center, which prevents the flexure in the out-of-plane direction from increasing. Considering the above, the stiffness in the shearing direction does not increase so much. Therefore, an effect of decreasing the frequency in the in-plane rotation mode can be expected.

Accordingly, shear stiffness of the pillar-shaped part 58 of the elastic support member 51 is involved in the in-plane rotation mode of the HDD as a rigid body, the pillar-shaped part 58 being partitioned by the horizontal plates 57. In addition, compression stiffness of the pillar-shaped part 58 of the elastic support member 51 is involved in the out-of-plane, and the out-of-plane rotation mode, of the HDD, relating to the thrust and conical modes of the spindle, the case thrust coupled mode, and the case spindle fall coupled mode, the pillar-shaped part 58 being partitioned by the horizontal plates 57. Basic dimensions of the pillar-shaped part 58 of the elastic support member 51 on both the upper and lower sides with respect to the horizontal fin 54, including the horizontal plates 57, are similar to those described in the first embodiment. However, as compared with the first embodiment, the frequency in the in-plane rotation mode decreases, and accordingly, the frequencies in the out-of-plane and in the out-of-plane rotation mode can be similarly designed. As a matter of course, although the flexure in the out-of-plane direction $\delta$out is at a similar level, the flexure in the in-plane direction $\delta$in grows larger than 1 through 2 mm with the decrease in frequency.

The elastic support member 51 is provided with the horizontal plates 57 so as to reduce the instability including buckling caused by the elongation. However, because the elastic member whose stiffness is reduced is used, a part denoted by reference numeral 52 formed with recesses 55, and projections having a longitudinal-fin shape denoted by reference numeral 53 are provided instead of the zigzag-shaped part. The part and the projections are formed so as to be in contact with the frame 12 and the base 10, respectively. Because deformation of the longitudinal-fin projections 53 in the in-plane rotation direction is bending deformation, the number of the projections increases. However, the longitudinal-fin projections 53 do not exert a large influence upon the vibration frequency in the in-plane rotation mode. The recesses 55 are elastic members whose stiffness decreases. Therefore, even if it is not part of thickness direction of the HDA, or even if it is not bending deformation, the recesses 55 do not exert a large influence upon the vibration frequency in the in-plane rotation mode. Accordingly, even one recess is sufficient, resulting in design in which the instability including buckling is taken into consideration. However, because spring characteristics of the recesses 55 are nonlinear, what is required is such design that an expected spring constant does not become large as a result of supporting the tare weight of the HDA. Moreover, in the case of an elastic member whose stiffness is small, notches and longitudinal-fin projections become unnecessary. As a result, the elastic support member is surrounded by the frame and the base.

Figure 7A:
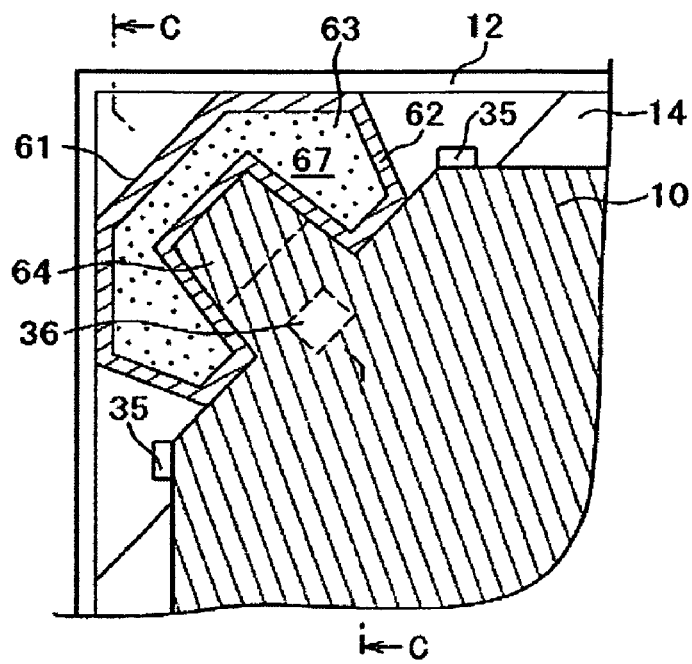
FIG. 7A illustrates a support structure of an HDA according to a fourth embodiment, and is a cross-sectional view taken along line C-C of FIG. 7B.
Figure 7B:
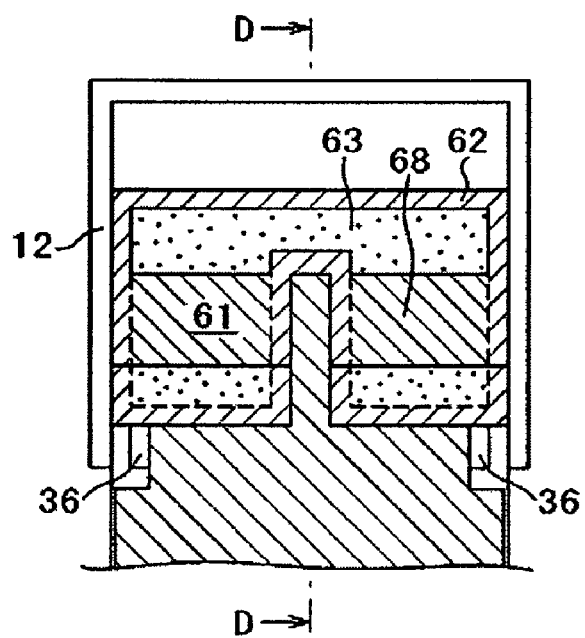
FIG. 7B is a cross-sectional view taken along line D-D of FIG. 7A.

A fourth embodiment will be described with reference to FIGS. 7A and 7B. FIG. 7A is a cross-sectional view taken along line D-D of FIG. 7B; and FIG. 7B is a cross-sectional view taken along line C-C of FIG. 7A. Paying attention to an elastic support member 61 with an oil damper, the base 10 is provided at its corner with a horizontal fin 64 that is parallel to a disk surface. The pillar-shaped part 68 of the elastic support member 61, which controls basic vibrational characteristics, is formed on both the upper and lower sides with respect to the horizontal fin 64. Accordingly, shear stiffness of the pillar-shaped part 68 of the elastic support member 61 is involved in the in-plane rotation mode of the HDD as a rigid body. In addition, compression stiffness of the pillar-shaped part 68 of the elastic support member 61 is involved in the out-of-plane and the out-of-plane rotation mode of the HDD, relating to the thrust and conical modes of the spindle, the case thrust coupled mode, and the case spindle fall coupled mode. Basic dimensions of the pillar-shaped part 68 of the elastic support member 61 on both the upper and lower sides with respect to the horizontal fin 64 are similar to those described in the first embodiment.

This embodiment is characterized by an oil damper 67 that is formed in addition to the pillar-shaped part 68 of the elastic support member 61. The oil damper 67 comprises an oil part 63, and an enclosure 62 for enclosing the oil part 63. The enclosure 62 is made of an elastic material. The damping of the oil damper 67 is achieved when disturbance and self-seek couple cause the horizontal fin 64 to move with the result that oil is stirred. As compared with the damping of the elastic support member 61, large damping characteristics are achieved. Therefore, higher vibrational characteristics can be expected. The enclosure 62 is also made of a thin elastic material, and part of the circumference of the enclosure 62 is free from binding and accordingly is capable of swelling. Even if the enclosure 62 is brought into contact with the frame 12 or the base 10, therefore, the stiffness does not largely increase. Since the oil damper is configured in such a manner as to be surrounded by the frame 12 and the base 10, an elastic material whose stiffness is lower than that in the first and second embodiments can be used as the material of the pillar-shaped part 68. In addition, an oil damper with more elongate dimensions can also be provided. In other words, this structure has less instability such as buckling and creep with respect to low frequency support. However, in order to achieve the lower frequency support in comparison with that in the first and second embodiments, the flexure in the in-plane direction $\delta$in caused by the tare weight should be more than 1 through 2 mm. This requirement is the same as the third embodiment. Therefore, it is necessary to design the pillar-shaped part 68 and the oil damper 67 that have such a shape. In addition, this elastic support member 61 with the oil damper can be combined with the mounting bracket as described in the second embodiment, or the horizontal plate as described in the third embodiment.

Figure 8A:
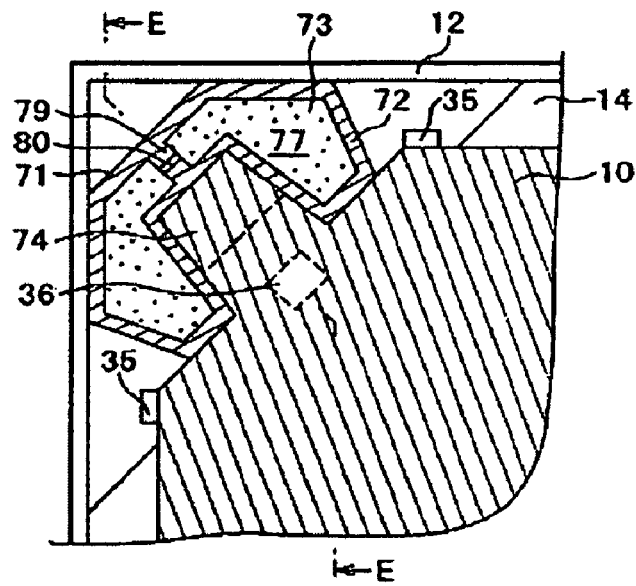
FIG. 8A illustrates a support structure of an HDA according to a fifth embodiment, and is a cross-sectional view taken along line E-E of FIG. 8B.
Figure 8B:
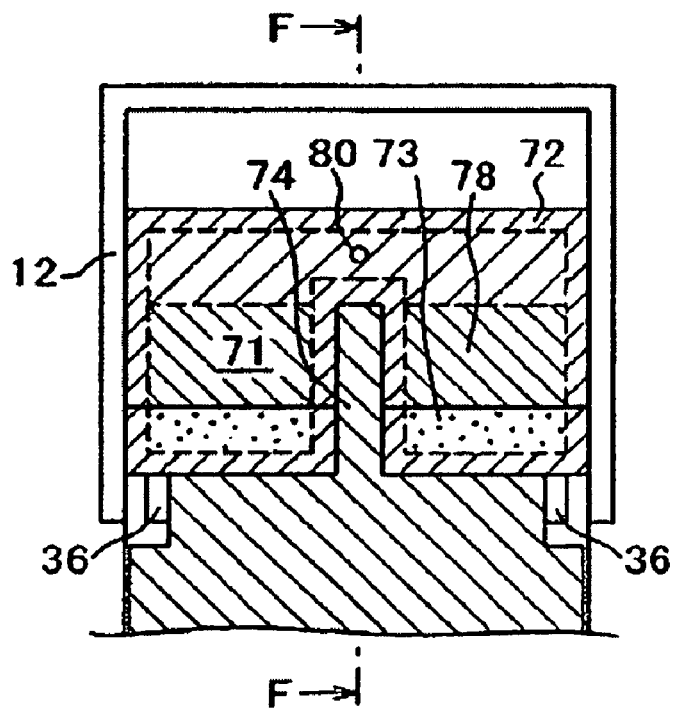
FIG. 8B is a cross-sectional view taken along line F-F of FIG. 8A.

A fifth embodiment will be described with reference to FIGS. 8A and 8B. FIG. 8A is a cross-sectional view taken along line F-F of FIG. 8B; and FIG. 8B is a cross-sectional view taken along line E-E of FIG. 8A. An elastic support member 71 with an oil damper is the same as that described in the fourth embodiment. However, a point of difference of the elastic support member 71 from that described in the fourth embodiment is that an oil part 73 is partitioned into two chambers by a vertical partition wall 79 that is provided with an orifice 80. When disturbance and self-seek couple cause a horizontal fin 74 to move, a damping effect is further produced by the resistance occurring when oil passes through the orifice 80. As a result of the movement of the horizontal fin 74, in the case of the vertical partition wall 79, a damping effect is produced in the in-plane rotation mode. On the other hand, little damping effect is produced in the out-of-plane and out-of-plane rotation mode. To produce a damping effect in the out-of-plane and out-of-plane rotation mode, it is desirable to adopt a horizontal partition wall.

Figure 9A:
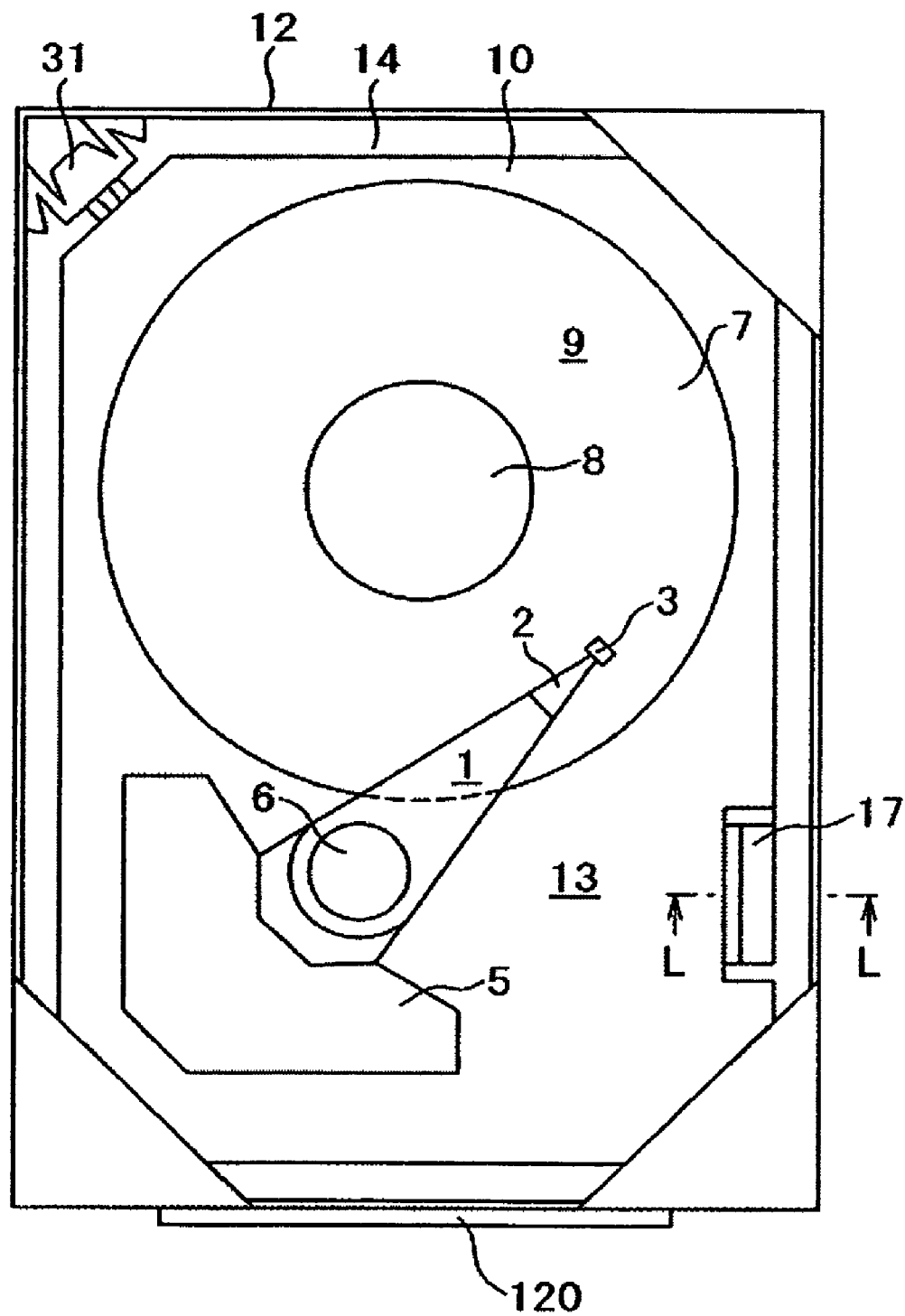
FIG. 9A is a plan view illustrating a modified example of the magnetic disk drive shown in FIG. 3A.
Figure 9B:
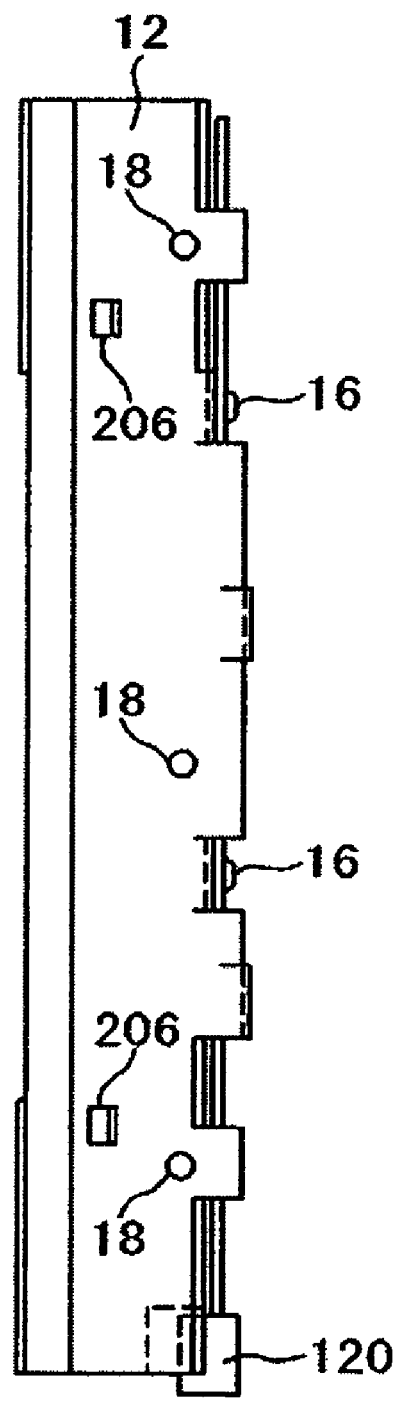
FIG. 9B is a side view of the magnetic disk drive shown in FIG. 9A.
Figure 9C:
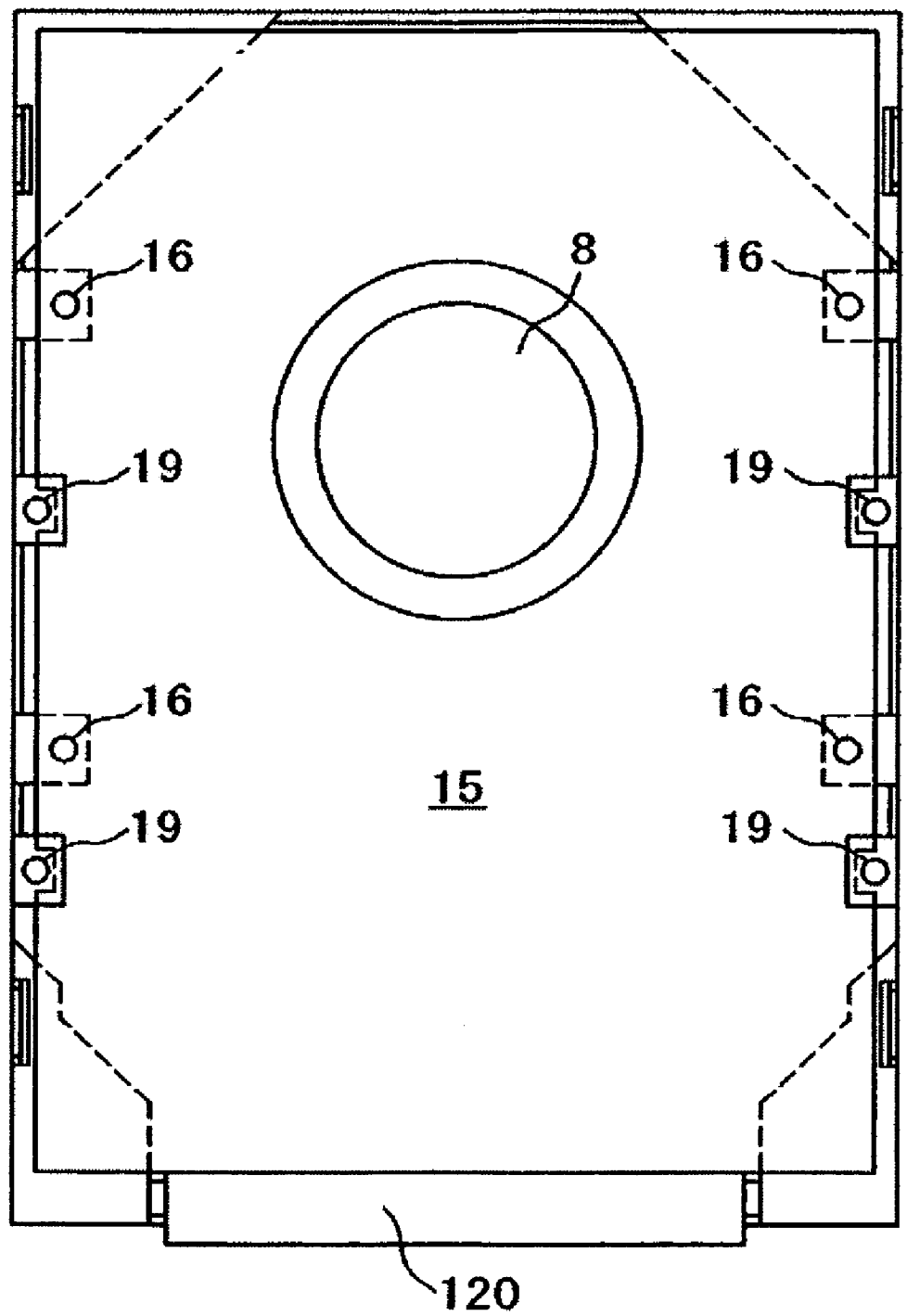
FIG. 9C is a bottom plan view of the magnetic disk drive shown in FIG. 9A.

FIGS. 9A, 9B, and 9C illustrate a modified example of the first embodiment. The configuration of the modified example is basically the same as that shown in the first embodiment. However, the kind of connector 120 of a PCB 15 differs from that in the first embodiment. As shown in FIG. 3A, the connector in the first embodiment is the connector 20 that is called a wide SCSI, which has a large width. The connector 120 shown in FIG. 9A is the usual SCSI connector, which has a little narrow width. In addition, there is a fiber channel connector, which has a narrower width than the SCSI connector. Therefore, in the case of the SCSI connector 120 or the fiber channel connector, the mounting space of the elastic support member 31 can be easily provided.

Figure 10:
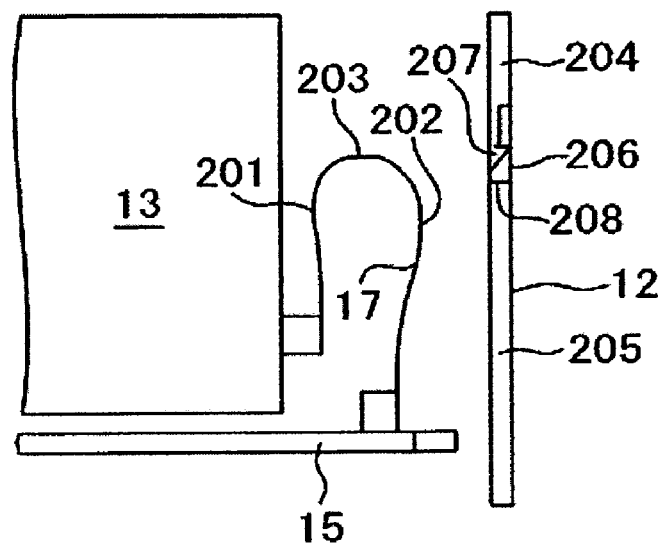
FIG. 10 illustrates a mounting structure of a FPC, and is a cross-sectional view taken along line K-K of FIG. 3A.

A description will be next made of the mounting structure of an FPC 17 that establishes electrical connection between the PCB 15 and the HDA 13. FIG. 10 is a diagram illustrating as an example the FPC 17 itself shown in FIG. 3A, and is a cross-sectional view taken along line K-K of FIG. 3A. The electric connection between the side surface of the HDA 13 and the PCB 15 is made through the U-shaped FPC 17. In this case, clearances are provided so that the U-shaped straight-line parts 201 and 202 of the FPC 17 do not come into contact with the HDA 13 and the frame 12, respectively. As a matter of course, an edge line 203 of the U-shaped bottom is also made to prevent from coming into no contact with other parts. In the case of patent document 1 having a plurality of bent portions, even if the bent portions come into contact with other ports, twist deformation occurs between the two bent portions. Accordingly, no bad influence is exerted upon the frequency in the in-plane rotation mode of the HDA 13. However, because the number of bending parts increases from one to several, it is necessary to keep the mounting space of the FPC according to the increase. Therefore, this necessity causes a disadvantage that the mounting space of other parts in the HDA is reduced. In this respect, adopting the U-shaped FPC 17, and providing the clearances between the straight-line parts 201, 202 and the HDA 13 and the frame 12, respectively, make it possible to cause twist deformation to easily occur in the edge line 203 at the U-shaped bottom. Accordingly, it is possible to support the HDA 13 at low stiffness while saving the mounting space. If no clearance is provided, the edge line 203 becomes hard to be twisted, and accordingly the frequency in the in-plane rotation mode increases. Consequently, if vibrational characteristics degrade, a shock is given, or strong vibrations act, the FPC 17 may be damaged. No problem with respect to the out-of-plane and the out-of-plane rotation mode arises because deformation of the FPC 17 is bending deformation.

With respect to the material and structure of the frame 12, since the frame 12 supports the HDA at low frequency, not only metallic materials including a metal plate but also polymeric materials including plastic as well as pulp materials including paper can be used as the material therefor. In addition, the screw holes 18, 19 of the frame 12 can be made by means of insert molding, calking, or the like. The polymeric materials and the pulp materials themselves have shock-absorbing properties. Therefore, the low frequency properties, including damping characteristics, of the elastic support member are added to impact-resistant properties, so that the frame can have superior impact-resistant properties. The above impact-resistant properties can be provided by the structure in which the elastic support member is provided at a portion thereof with a part having small stiffness, such as a bending part, a projection, and a recess, to avoid buckling, and comes into contact with the base or frame.

FIG. 10 illustrates one example the frame structure. The frame 12 is configured to be divided into two parts 204 and 205 in the thickness direction thereof. A parting line is shown as reference numeral 208 in FIG. 10. The part 204 is fitted to the part 205 by inserting a claw 207 of the part 204 into a hole 206 of the part 205.

Figure 11:
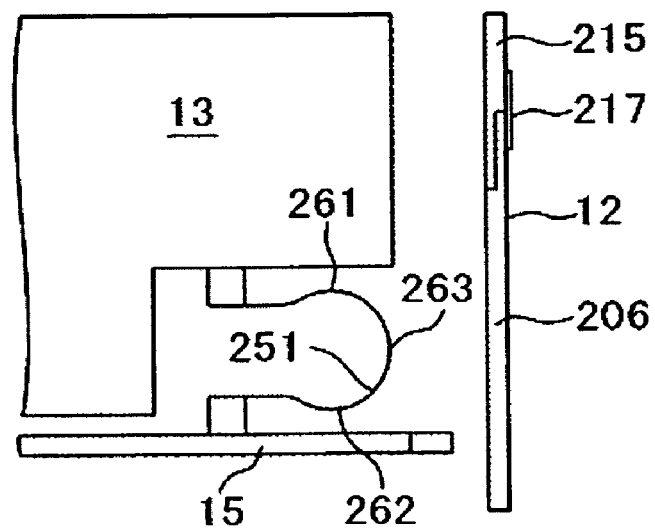
FIG. 11 is a diagram illustrating another example of a mounting structure of an FPC.

FIG. 11 is a diagram illustrating another example of the mounting structure of an FPC. In contrast to FIG. 10, electric connection between the bottom surface of the HDA 13 and the PCB 15 is made through an U-shaped FPC 251. In this case, clearances are provided so that a part 261, a part 262 and an edge line 263 of the U-shaped parts in the FPC 251 do not come into contact with the HDA 13, the PCB 15, and the frame 12, respectively. In FIG. 11, with respect to the in-plane rotation mode, deformation of the FPC 251 is twist deformation; and with respect to the out-of-plane, and the out-of-plane rotation mode, deformation of the FPC 251 is bending deformation. FIG. 11 illustrates another example of the frame structure. A part 215 of the frame 12 is fitted to a part 216 of the frame 12. The part 215 and the part 216 are jointed together with a tape 217.

Figure 12A:
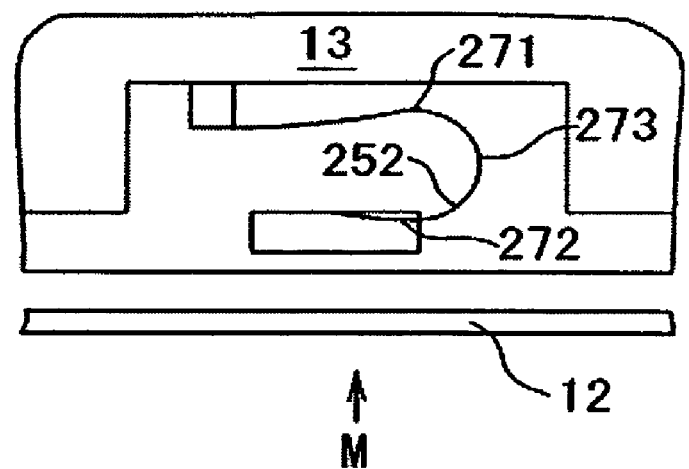
FIG. 12A is a diagram illustrating still another example of a mounting structure of a an FPC.
Figure 12B:
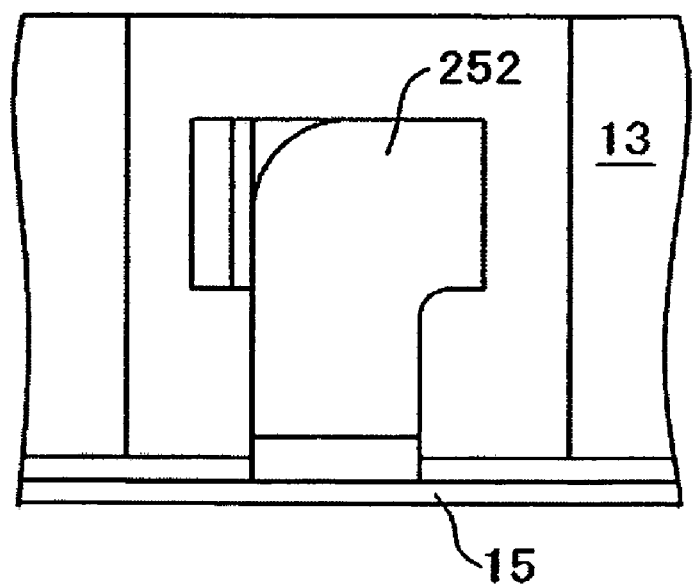
FIG. 12B is a diagram illustrating an HDA in FIG. 12A, which is viewed from a direction M.

FIGS. 12 and 12B illustrate still another example of the mounting structure of the FPC. FIG. 12A is a top view of the HDA 13; and FIG. 12B is a side view of the HDA 13 as viewed from an arrow M. However, in FIG. 12B, the frame 12 is omitted so that the FPC 252 can be seen. Electric connection between the side surface of the HDA 13 and the PCB 15 is made through the U-shaped FPC 252. However, the FPC 252 does not have a simple U-shape. The FPC 252 on the side of the PCB 15 is bent at a right angle and then mounted the PCB 15. In this case, clearances are provided so that the U-shaped parts 271, 272 and an edge line 273 of the FPC 252 does not come into contact with the HDA 13 or the frame 12. In this mounting method, with respect to the in-plane rotation mode, deformation of the FPC 252 is bending deformation; and with respect to the out-of-plane and out-of-plane rotation mode, deformation of the FPC 252 is twist deformation.

Figure 13:
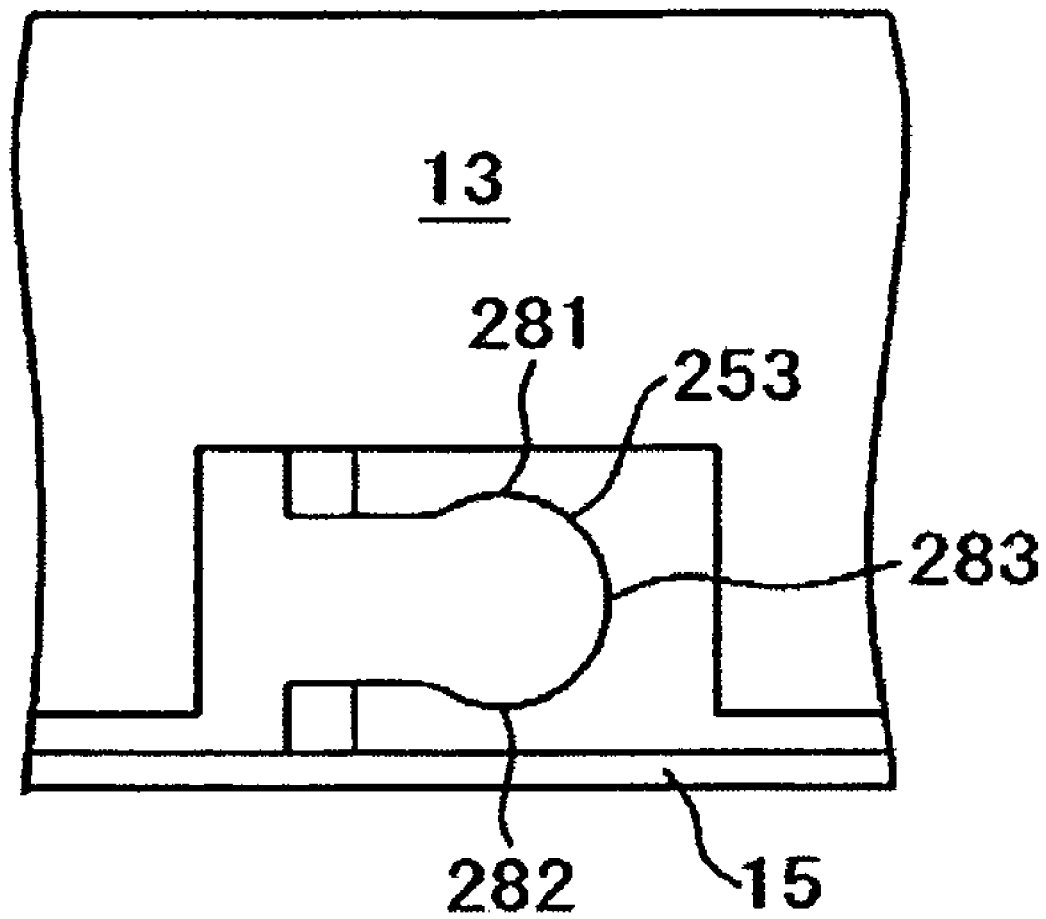
FIG. 13 is a diagram illustrating a further example of a mounting structure of an FPC.

FIG. 13 illustrates a still further example of the mounting structure of an FPC. In contrast to FIG. 12A, electric connection between the bottom surface of the HDA 13 and the PCB 15 is made through a U-shaped FPC 253. In this case, clearances are provided so that the U-shaped parts 281, 282 and an edge line 283 of the FPC 253 does not come into no contact with the HDA 13 or the PCB 15. In this mounting method, with respect to the in-plane rotation mode, deformation of the FPC 253 is bending deformation; and with respect to the out-of-plane and out-of-plane rotation mode, deformation of the FPC 253 is twist deformation.

As described above, according to the embodiments of the present invention, it is possible to provide a magnetic disk drive with high recording density by minimizing the limitations of mounting space, and by reducing vibrations in the in-plane rotation mode of the HDD, which are caused by couple and disturbance occurring in seek operation, vibrations in the thrust mode, and the conical mode, of the spindle, which are caused by disturbance, vibrations in the case thrust coupled mode, the spindle fall mode, and the like, so that a positioning error is improved. In addition, track move is completed when vibration, that is, the amount of deviation from a target track, is reduced to a specified value or less at which it is possible to judge that data can be read/written. The reduction in vibration makes it possible to shorten the track move time. As a result, data access performance is improved.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
 a spindle mounting a magnetic disk thereon;
 a spindle motor to provide the spindle with a driving force to rotate the spindle;
 a base that supports the spindle through bearings so that the spindle can rotate;
 an actuator that supports a magnetic head that writes/reads information to/from the magnetic disk, said actuator being mounted to the base;
 a frame that surrounds the base; and
 a pillar-shaped elastic support member provided with a recess into which a horizontal fin protruding from the base is inserted, said elastic support member being placed between the frame and the base;
 wherein said pillar-shaped elastic support member is provided with respective projections on the upper and lower sides thereof with respect to the recess, said projections coming into contact with the base.

2. A magnetic disk drive according to claim 1, wherein:
 said elastic support member is placed in each of at least two of four corners of the base.

3. A magnetic disk drive according to claim 1, wherein:
 said horizontal fin comprises metal fittings for mounting the elastic support member to the base.

4. A magnetic disk drive according to claim 1, wherein:
 said elastic support member has a zigzag-shaped part that comes into contact with the frame.

5. A magnetic disk drive according to claim 1, wherein:
 said elastic support member has a pair of zigzag-shaped parts that are disposed on opposite sides and come into contact with the frame.

6. A magnetic disk drive according to claim 1, wherein:
 said projections on the upper and lower sides of the pillar-shaped elastic support member are longitudinal-fin projections.

7. A magnetic disk drive according to claim 1, wherein:
 said pillar-shaped elastic support member is mounted on the upper and lower sides thereof to the base by a mounting bracket.

8. A magnetic disk drive according to claim 1, wherein:
 said elastic support member includes at least one horizontal plate inside the elastic support member.

9. A magnetic disk drive according to 1, wherein:
 said elastic support member comprises an oil damper that includes oil and an enclosure for enclosing the oil, said enclosure being made of an elastic material.

10. A magnetic disk drive according to claim 9, wherein:
 said oil damper has a partition wall for partitioning the enclosure, said partition wall being provided with an orifice.

11. A magnetic disk drive according to claim 10, wherein:
 said partition wall is vertical.

12. A magnetic disk drive according to claim 1, further comprising:
 a circuit board on which electronic parts are mounted, said circuit board being mounted to the base; and
 a flexible printed circuit for connecting parts on the base to electronic parts on the circuit board, said flexible printed circuit being formed in a U-shape so that clearances are provided outside two straight-line parts of the U-shape.

13. A magnetic disk drive comprising:
 a spindle mounting a magnetic disk thereon;
 a spindle motor to provide the spindle with a driving force to rotate the spindle;
 a base that supports the spindle through bearings so that the spindle can rotate;
 an actuator that supports a magnetic head that writes/reads information to/from the magnetic disk, said actuator being mounted to the base;
 a frame that surrounds the base; and
 elastic support means for receiving a horizontal fin protruding from the base, said elastic support means being placed between the frame and the base;
 wherein said elastic support means is mounted to the base by a mounting bracket.

14. A magnetic disk drive according to claim 13, wherein:
 said elastic support means is placed in each of at least two of four corners of the base.

15. A magnetic disk drive according to claim 13, wherein:
 said horizontal fin comprises metal fittings for mounting the elastic support means to the base.

16. A magnetic disk drive according to claim 13, further comprising:
 a circuit board on which electronic parts are mounted, said circuit board being mounted to the base; and
 a flexible printed circuit for connecting parts on the base to electronic parts on the circuit board, said flexible printed circuit being formed in a U-shape so that clearances are provided outside two straight-line parts of the U-shape.

* * * * *